United States Patent [15] 3,699,390

Blakeslee [45] Oct. 17, 1972

[54] ELECTRONIC SEQUENTIAL SWITCH

[72] Inventor: Kenneth L. Blakeslee, 330 Glencourtney Drive, N.W., Atlanta, Ga. 30328

[22] Filed: Sept. 23, 1971

[21] Appl. No.: 183,098

[52] U.S. Cl. ..............317/16, 307/252 B, 307/252 Q

[51] Int. Cl. ..............................................H02h 3/08

[58] Field of Search......317/16, 33 SC; 307/252 B, 252 Q

[56] References Cited

UNITED STATES PATENTS

| | | | |
|---|---|---|---|
| 3,444,448 | 5/1969 | Welch | 307/252 B |
| 3,513,332 | 5/1970 | Snyder | 307/252 B |
| 3,644,755 | 2/1972 | Shaw | 307/252 B |

*Primary Examiner*—James D. Trammell

[57] ABSTRACT

An electronic sequential switch consists of two or more alternating current power switches and associated electronic networks to produce two separately controlled power switching levels. All power switches are gated into conduction simultaneously late in each current half cycle resulting in a low average current flow in the load. Only one of the many power switches receives a conduction signal early in the half cycle and its load receives a high average current. The high average current mode is switched through the many power switches one at a time and is automatically recycled to the first power switch when the final power switch is turned off. The combined circuits provide a means for maintaining a minimum power to all loads at all times and switching a high power to a single load sequentially. Both power levels and sequence rate are adjustable.

7 Claims, 2 Drawing Figures

PATENTED OCT 17 1972 3,699,390

INVENTOR
KENNETH L BLAKESLEE
Kenneth L. Blakeslee

ELECTRONIC SEQUENTIAL SWITCH

This invention relates to sequential switching devices and more particularly to a new and improved electronic device capable of switching from a minimum power on all loads to a higher power on a single load in sequence. Both levels of power to the loads are continuously variable and adjustable as well as the rate of sequencing. Electronic crowbar protection is incorporated in the sequential device to protect the solid state power switches against an over-current fault in the load.

In general, the presently known sequential switching devices incorporate mechanically operated point contact switches that pit and burn quickly and have no means for controlling or varying the power applied to the load. Additionally they provide a very limited range of sequential switching rate. Present known devices give no internal overcurrent protection and must depend upon other slow acting devices external to the switch for removing power to the load when faults occur.

Accordingly it is an object of the present invention to provide a new and improved electronic sequential switch which overcomes the combined disadvantages and limitations of the present known switches.

Another object of the invention is to provide multiple variable power level switching to the load and to eliminate all wear and degradation due to moving parts.

An additional objective of the invention is to remove power applied to the load within one half cycle of a 60 cycle alternating current after a load fault occurs.

A further objective of the invention is to provide a compact solid state switching unit having a wide range of continuously variable switching rates.

These and other objects of the invention are attained through the use of an alternating current source and a plurality of bidirectional triode thyristors, one each connected in series with its corresponding load and the current source. Each bidirectional triode thyristor has a gating element which upon the presence of a gate current pulse rapidly switches the thyristor from a nonconducting to a conducting state. In the conducting state current flows through the thyristor and the load for the remainder of the alternating current half cycle. With current flow reversal the bidirectional triode thyristor is returned to a nonconducting state where it remains until the occurrence of the next gate current pulse, thereupon, the operation is repeated. Average current in the load is controlled by gating on the bidirectional triode thyristor at the same phase angle of alternating current each half cycle. Changes in average load current are accomplished by altering the angular occurence of the gate current pulse.

While all bidirectional triode thyristors receive small conduction angle gating every current half cycle, only one receives large conduction angle gating. The large angle gating is sequenced continuously through the plurality of bidirectional triode thyristors by recycling a shift register or ring counter network. The sequencing rate is determined by a variable repetition rate relaxation oscillator. Each pulse from the sequence rate oscillator advances the shift register output one position. Repeated pulses from the sequence rate generator causes continuous sequencing and recycling of the large angle conduction mode through the plurality of bidirectional triode thyristors.

The large conduction angle gate pulse is generated in a phase related relaxation oscillator similar to the small angle relaxation oscillator, however, these current gate pulses are applied to the anodes of a plurality of silicon control rectifiers. The cathode terminal of each silicon control rectifier is connected to a bidirectional triode thyristor gate element and each silicon control rectifier gate element is connected to an output position on the shift register. Large angle gate pulses are inhibited from the bidirectional triode thyristor gate element by all but one silicon control rectifier. The single conducting silicon control rectifier is held in conduction by the output voltage level from the active position of the shift register. As the shift register steps through its sequence each corresponding silicon control rectifier is gated into conduction allowing large conduction angle pulses to gate on the corresponding bidirectional thyristor.

Electronic crowbar protection for the bidirectional triode thyristors and loads is provided through the use of a rapid acting overcurrent sensing magnetic reed relay and silicon control rectifier network. Upon an overcurrent surge the magnetic reed relay closes. This action provides a conduction path to gate on a silicon control rectifier. The silicon control rectifier remains in conduction even though the relay may later open. The conducting silicon control rectifier removes the phase related reference current from both the large and small angle gate generators thus inhibiting them from further generation of gate pulses. Without gate pulses all bidirectional triode thyristors remain nonconducting for all following alternating current cycles. Disconnecting and reapplication of the alternating current source after removal of the load fault restores the sequential switch to normal operation.

Further objects and advantages of the invention will be apparent from a reading of the following description in conjunction with the accompanying drawings which:

Figure 1:
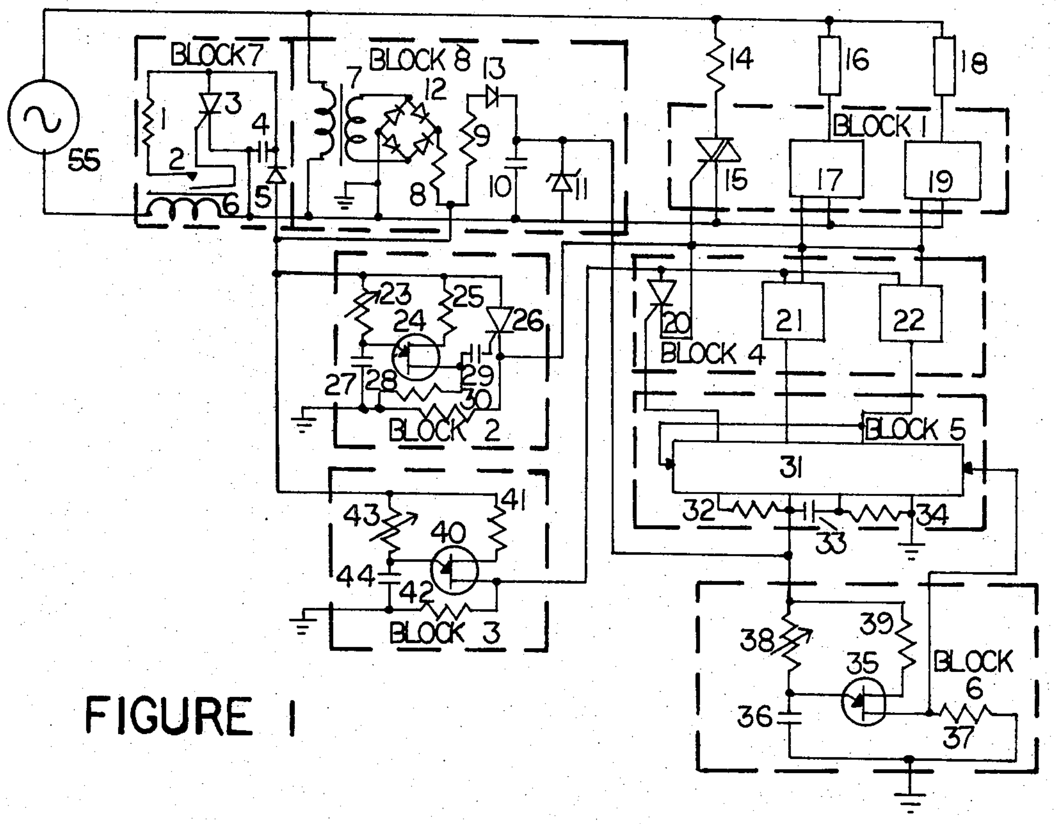
FIG. 1 is a schematic block diagram showing the interconnection of the many electronic networks.

In the representative embodiment of the invention shown in the drawings an electronic sequential switch is comprised of an array of electronic components and circuits arranged in such a way to make possible multiple variable controls of average power applied to the loads and a variable rate of sequencing power to the loads.

Primary to the invention is the plurality of bidirectional triode thyristor electronic power switches 15, 17, and 19, contained in block number 1, FIG. 1, which are connected in series with an alternating current source 55, and loads 14, 16, and 18, respectively. The electronic power switches used are capable of conducting current bidirectionally. The electronic power switches, however, will not conduct current in either direction until gate current is made to flow through their gate element. With gate current they rapidly switch to a conducting state and conduct current in the direction dictated by the alternating current source 55. Upon reversal electronic power switches return to a nonconduction state and remain in that state until gate current is again applied. This operation is repeated each half cycle. The average current through each electronic power switch 15, 17, and 19, and its associated load 14, 16, and 18, is dependent upon the conducting to nonconducting ratio shown in FIG. 2, wave form line 46, 47, and 48, respectively, and is determined by the time relation of the gate current waveform line 49 and 50 and the alternating current phase waveform line 45. Gate current immediately following each alternating current reversal results in a large conducting to nonconducting ratio and high average current, whereas gate current occuring later in the half cycle results in a small conducting to nonconducting ratio and a low average current. The remainder of the blocks in FIG. 1, are designed to produce and control the time and phase relation of the gate currents applied to the plurality of electronic power switch gate elements.

Block 2, FIG. 1, consists of the necessary electronic components arranged into a network to produce pulse gate current waveform line 50, which gate simultaneously all electronic power switches into conduction. Block 2 consists of a unijunction transistor 24, and the resistor 23, capacitor 27, arrangement to produce a relaxation pulse oscillator. Positive full-wave rectified voltage is supplied to resistors 23, and 25. In this manner the oscillator timing sequence commences each half cycle. The time delay from the beginning of the half cycle to a pulse output is dependent upon the resistance 23, to capacitance 27 ratio in the unijunction transistor 24 emitter circuit. Resistor 23 is made variable so the gate current pulse can be delayed from a few degrees of the start of the half cycle to the end of the half cycle. As positive full-wave rectified voltage nears 180° (zero value) the unijunction transistor 24, $base_2$ voltage, decreases to a point below capacitor 27 stored voltage level, whereupon, the unijunction transistor conducts and discharges capacitor 27. With no residual charge on the capacitor the timing sequence starts anew each half cycle independent of the variable resistor setting. The gate pulse is amplified through a silicon control rectifier 26 before being applied to electronic power switches 15, 17, and 19. The silicon control rectifier returns to a nonconducting state at the end of each positive full-wave rectified half cycle.

Block 3, FIG. 1, consists of identical type components as in the small angle gate generator block 2. The silicon control rectifier driver, however, is not required since only one electronic switch in sequence is gated resulting in reduced gate current requirements. The variable timing sequence is the same, however, due to the choice of variable resistor 43, and capacitor 44 values, gate pulses can occur very soon after the start of the alternating current half cycle. Due to the choice of resistor capacitor values additional output pulses may be produced during the half cycle, however, this is of no consequence since only the first pulse each half cycle is required. The output pulses are applied to block 4.

Block 4, FIG. 1, consists of a plurality of silicon control rectifiers 20, 21, and 22, one each for each electronic power switch. Output pulse waveform line 49 is applied to each silicon control rectifier 20, 21, and 22, anode. Each silicon control rectifier cathode is connected to a corresponding electronic power switch 15, 17, and 19, gate element. Only one of the silicon control rectifiers is held in a conducting state by the presence of a positive voltage on its gate element. Waveform lines 51, 52, and 53, are applied to silicon control rectifiers 20, 21, and 22, respectively from the separate outputs of the shift register 31, block 5. The incoming large angle gate pulse waveform line 49 is transmitted through the conducting silicon control rectifier to the gate element of the corresponding electronic power switch. The presence of these gate pulses results in an increase in the conduction angle of the electronic power switch and the high average current mode. All nonconducting silicon control rectifiers block the transmission of large angle gate pulses to their corresponding electronic power switch. When the shift register 31 transfers the positive voltage from a conducting to a nonconducting silicon control rectifier, time $t_2$, FIG. 2, the conducting silicon control rectifier 20 returns to a nonconducting state between large angle gate pulses and thereby inhibits them from the corresponding electronic power switch 15. Large angle gate pulses are now transmitted through conducting silicon control rectifier 21 to its corresponding electronic power switch 17. The transfer of the positive voltage to silicon control rectifier 22, corresponds to $t_3$, in FIG. 2. In this way the high average current mode is sequenced through the plurality of electronic power switches and is repeated each time in the same sequence as the shift register recycles.

Figure 2:
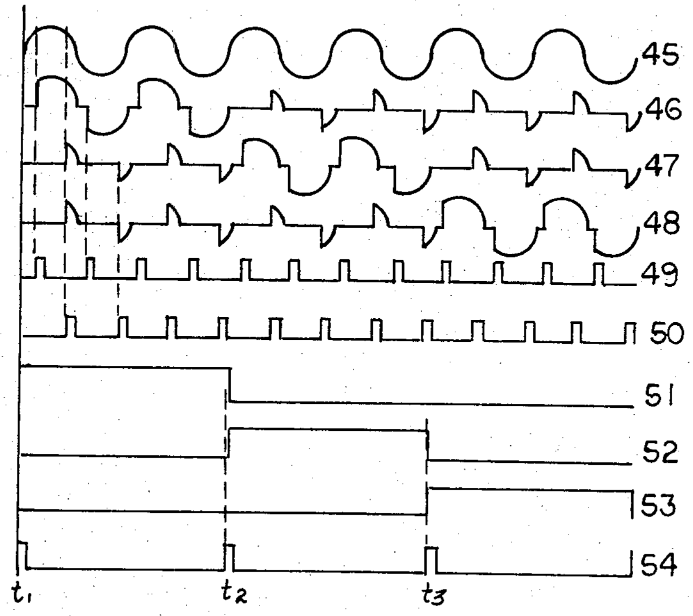
FIG. 2 is a diagram of the many voltage waveforms in time and phase sequence.

Block 5, FIG. 2, consists of an integrated circuit shift register 31, that is capable of both serial and parallel operation. Upon initial turn-on at $t_1$, capacitor 33, and resistor 34, temporarily holds the register in parallel mode operation. During this time the first position output registers a positive voltage waveform line 51, due to the positive voltage applied to the shift register through resistor 32. At this time the second and third outputs register a near zero voltage. As the voltage across resistor 34 drops to zero due to capacitor 33 becoming completely charged the register reverts to its serial mode of operation. In this mode each pulse, waveform line 54, from the sequence rate generator, block 6, shifts the positive output voltage one position. This switching corresponding to $t_1$, $t_2$, and $t_3$, and first position output waveform line 51, second position output waveform line 52, and third position waveform line 53. When the positive voltage reaches the third position information is fed back into the serial input of the shift register so that the next pulse from the rate generator shifts the positive output voltage back to the first position corresponding to $t_1$, and the sequence is repeated.

Block 6, FIG. 1, consists of a unijunction transistor 35, relaxation pulse oscillator. Resistor 38, in the resistor 38 capacitor 36 timing network, is variable so the pulse repetition rate can be varied over a wide range. The output pulse repetition rate establishes the electronic power switch high power mode sequence rate.

Over current sensing and electronic crowbar protection is provided by block 7, FIG. 1. The circuit consists of a magnetic sensitive read relay 2 contained in a heavy solenoid winding 6 which conducts the source alternating current. Over current through the solenoid causes the read relay to close and gate on silicon control rectifier 3 which provides a shorted path to ground for the positive full wave voltage supplied to the large and small angle gate generators. Without supply voltage the gate generators are disabled and produce no gate pulses. Without gate pulses the electronic power switches remain nonconducting for all the following alternating current half cycles. Diode 5 and capacitor 4 provide holding current for the silicon control rectifier 3 during the alternating current reversal period. The silicon control rectifier remains in a conducting state until the alternating current source 55 is disconnected. Reconnection of the alternating current source will reinstate the power sequence operation unless the over current condition remains. Should the load fault remain the operation will again stop after the first half cycle of alternating current.

Block 8, FIG. 1, consists of a stepdown voltage transformer 7 and a full wave bridge rectifier 12. Unfiltered positive wave rectification is supplied to the large, block 3, and small, block 2, angle gate generators so to maintain phase reference. Capacitor 10 filtered direct current is supplied to the shift register block 5, and the sequence rate generator block 6.

Although the invention has been described herein with reference to a specified embodiment, many modifications therein will readily occur to those skilled in the art. Accordingly all such variations and modifications are included within the intended scope of the invention as defined by the following claims.

I claim:

1. An electronic sequential switch comprising: an alternating current source, a plurality of phase controlled electronic power switches each having a control electrode; a plurality of loads one each connected in series with an electronic power switch and the current source, a phase reference electronic relaxation pulse oscillator and power amplifier connected directly to all electronic power switch control electrodes, a second phase referenced electronic relaxation pulse oscillator connected to the first of two input terminals each on a plurality of AND gates one each AND gate output being connected to a corresponding said electronic power switch control electrode, a shift register network having a plurality of outputs one each connected to the second of the two input terminals of said AND gates, a third non-phase related electronic relaxation pulse oscillator connected to the clock shift input of said shift register, an electronic crowbar circuit acting on load overcurrent to remove the phase related voltage from the two electronic phase related relaxation pulse oscillators thereby disabling them from further pulse generation and a full-wave rectified direct current power source to supply current to the non-phase related relaxation pulse oscillator and shift register.

2. An electronic sequential switch according to claim 1, wherein, the first and second named electronic relaxation pulse oscillator networks each contain a variable resistance capacitance arrangement making possible a pulse output that is variable in time relation to the source alternating current phase.

3. An electronic sequential switch according to claim 1, wherein, the third named electronic relaxation pulse oscillator contains a variable resistance capacitance arrangement making possible a widely varying pulse repetition rate.

4. An electronic sequential switch according to claim 1, wherein all electronic power switches are switched into conduction for a small part of each alternating current half cycle.

5. An electronic sequential switch according to claim 1, wherein each electronic power switch in sequence is switched into conduction for a large part of each alternating current half cycle.

6. An electronic sequential switch according to claim 1, wherein the switching rate of the large conducting angle from electronic power switch to electronic power switch is variable over a wide controlled range.

7. An electronic sequential switch according to claim 1 wherein alternating current flow can be interrupted in a load fault in a time period not to exceed one alternating current half cycle.

* * * * *